United States Patent [19]

Kiss et al.

[11] Patent Number: 4,800,217
[45] Date of Patent: Jan. 24, 1989

[54] PAINT DETACKIFICATION

[75] Inventors: Charles R. Kiss, Asstabula, Ohio; Shu-Jen W. Huang, Schaumburg, Ill.

[73] Assignee: Nalco Chemical Company, Naperville, Ill.

[21] Appl. No.: 146,633

[22] Filed: Jan. 21, 1988

Related U.S. Application Data

[63] Continuation of Ser. No. 62,526, Jun. 12, 1987, Pat. No. 4,764,561.

[51] Int. Cl.$^4$ .................... C08F 82/80; C08L 31/00; C08L 33/00; C08L 35/00
[52] U.S. Cl. ................................. 525/163; 134/38; 210/734
[58] Field of Search .............. 55/85; 134/38; 210/725, 210/728, 734; 427/222; 525/163

[56] References Cited

U.S. PATENT DOCUMENTS

| | | | |
|---|---|---|---|
| 3,901,840 | 8/1975 | Irvin et al. | 525/163 X |
| 3,959,554 | 5/1976 | Hick | 525/163 X |
| 4,130,674 | 12/1978 | Roberts et al. | 427/331 |
| 4,422,944 | 12/1983 | Selvarajan et al. | 210/736 |
| 4,472,284 | 9/1984 | Bolhofner | 210/708 |
| 4,481,116 | 11/1984 | Cabestany et al. | 210/735 |
| 4,490,417 | 12/1984 | Shindow et al. | 525/163 X |
| 4,629,572 | 12/1986 | Leitz et al. | 210/714 |
| 4,656,059 | 4/1987 | Mizuno et al. | 427/345 |

FOREIGN PATENT DOCUMENTS

| | | |
|---|---|---|
| 2541293 | 8/1984 | France . |
| 49-054447 | 5/1974 | Japan . |
| 60-248286 | 12/1985 | Japan . |

*Primary Examiner*—Michael Lusignan
*Attorney, Agent, or Firm*—John G. Premo; Anthony L. Cupoli; Donald G. Epple

[57] ABSTRACT

A paint spray booth detackifying composition which includes mixtures of styrene-acrylate polymer and a melamine-formaldehyde polymer and the method of using same.

1 Claim, No Drawings

PAINT DETACKIFICATION

This application is a continuation of application Ser. No. 062,526, filed June 12, 1987, now U.S. Pat. No. 4,764,561, patented Aug. 16, 1988.

FIELD OF THE INVENTION

The invention relates to paint spray detackifying compositions and the method of using them.

Dosages are given on an actives basis unless otherwise specified.

Molecular weight is defined to be weight average molecular weight.

BACKGROUND OF THE INVENTION

In the 1980's the paint technology in the automotive industry, as well as, industry in general has advanced from the utilization of low dispersion lacquers to high solids enamels. This has been due to a need to reduce solvent emission and disposal. These high solid enamels are particularly useful in basecoat/clearcoat technology.

As the paint technology has advanced, more emphasis has been on spray booth detackifiers as high solid enamels are much harder to detackify than low dispersion lacquers.

To satisfy these needs, the compositions of this application have been developed.

Thus, it is an object of this invention to provide a detackifier that can kill automotive basecoat/clearcoat paints and stay non-sticky throughout the whole process.

It is an object of this invention to provide a composition that will provide a detackified paint sludge having minimum volume and high dewaterability.

It is an object of the invention to provide a detackifier that will have low toxicity.

SUMMARY OF THE INVENTION

The invention includes a paint detackifying composition and the method of using it. In broadest terms, the paint detackifying composition includes a melamine-formaldehyde resin styrene-acrylate resin mixture with a mole ratio within the range of 2:1 to 4:1, respectively. This mixture preferably is provided in an aqueous system at a dosage of at least 25 ppm and at most 800 ppm.

THE DISCUSSION OF THE INVENTION

In practice, a suitable melamine-formaldehyde resin is provided under the trademark MAGNIFLOC 515C, a trademark of the American Cyanamid Company. Generally, suitable melamine formaldehyde resins should have a weight average molecular weight of at least 2,000 and be soluble in water at pH below 2.5. Preferably, the molecular weight will be in the range of 2,500–4,000.

A suitable styrene-acrylate resin is provided under the trademark ESICRYL R-11, a trademark of the Emulsion System Company or OPACIFIER 11, a trademark of the Essential Chemical Company. Styrene-acrylate resins generally can be used. However, the most preferred will have a molecular weight within the range of 50,000-100,000.

Generally, the styrene-acrylate polymer is prepared separately and packaged separately from the melamine-formaldehyde polymer. The two are then charged into the system. The styrene-acrylate can be used as purchased. Melamine-formaldehyde can also be used as purchased.

LABORATORY TEST

Laboratory tests were conducted using a clay/amine product which is a standard in the industry today, representing over 60% of the U.S. detackifying market for high density paint systems.

Desired amounts of detackifiers were added to the water manually or using a chemical pump to monitor the chemical demand. These detackifiers were allowed to mix in the tank through water circulation for 5 minutes. The paint being tested was then sprayed into the chamber at a rate of 2 ml/min through an air atomized spray gun located 12 inches above the center of the scrubbing section. An exhaust fan pulling air from the lower section of the scrubbing chamber helped the air flow through the water and increased scrubbing efficiency. This exhaust fan also aided in eliminating paint mist during the test and made the whole unit operable in that atmosphere. The test paint was sprayed for 10 minuts and the paint kill then tested for tackiness or stickiness. Tackiness or stickiness was determined by wetting the test runner's hand by the water solution in the test tank and taking a sample of the floating paint sludge from the water tank and squeezing and rubbing it slightly between his fingers until a degree tackiness is determined. The test is somewhat subjective. However, that is the best method that is currently available.

In general, at the conclusion of a good paint kill, paint is continuously sprayed, and the paint sludge conditions tested every 10 minutes. At any given time, if any trace of tackiness of sludge is present, paint spray should be discontinued and the program re-examined. The amount of paint sprayed, the chemical dosage, and condition of sludge should be recorded.

Additional chemicals should be added and paint spray resumed. Repeat this process at least four times.

Let's take a hypothetical example of the test in order to see how the product maintenance ratio is calculated:

| mls of paint sprayed | mls of chemicals added | Comments |
| --- | --- | --- |
| 0 | 57 ml (or 3,000 ppm) | Start spraying initial kill #8 |
| 120 | 19 | Final kill #6 recharge chemicals |
| 60 | 19 | Recharge chemicals |
| 55 | 19 | Recharge chemicals |
| 67 | | Finish sprayed |

In this case, the initial charge of chemicals is 19 mls or 1,000 ppm (based on 5 gallons of water) and the product maintenance ratio is 3:1 paint/product.

In the following tests, the maintenance ratio represents the ratio of paint to product requred to maintain acceptable levels of tackiness or stickiness for the paint kill.

Test 1

Paint: DuPont 706-AC 301 white base coat
Wt. % solids: 59%
Spray Rate: 2.0 ml/min
Water recirculation rate: 2 GPM
Product use: polyamine and bentonite clay slurry at 1:3 ratio on active basis
Initial Charge: 300 ppm Maintenance Charge: 3:1 paint:product

Test 2

Paint: DuPont 706-AC 301 white base coat
Wt. % solids: 59%
Spray Rate: 2.0 ml/min
Water recirculation rate: 2 GPM
Product use: melamine formaldehyde/styrene-acrylate at 2.4:1 ratio
Initial Charge: 820 ppm
Maintenance Charge: 15:1 paint:product

Test 3

Paint: DuPont clear coat RK-3840
Wt. % solids: 60.0%
Spray Rate: 2.0 ml/min
Water recirculation rate: 2 GPM
Product use: melamine formaldehyde/styrene-acrylate at 4:1 ratio
Initial Charge: 900 ppm
Maintenance Charge: 10:1 paint:product

Test 4

Paint: In Mont E12 CK002
Wt. % solids: 35%
Spray Rate: 2.0 ml/min
Water recirculation rate: 2 GPM
Product use: melamine formaldehyde polymer/styrene-acrylate at 3:1 ratio
Initial Charge: 70 ppm
Maintenance Charge: 35:1 paint:product

DISCUSSION OF TEST RESULTS

Generally, we have found that the laboratory test results have higher detackifier requirements than are actually needed in the field. A discrepancy occurs primarily due to difference in spray rate vs. water flow rate under laboratory and field conditions.

In practice, the polymer works best when dosed in a system having a pH within the range of 7.5 to 9.5.

Generally, the system should be dosed prior to the detackification process. Pre-dosing appears to allow the formation of floc and adequate dispersion of the detackifier throughout the system.

Preferably, floc within the range of 0.1 to $\sim 1\mu$ micron will be formed. Generaly floc with the range of 0.5–0.75 microns is found to be most desirable.

The detackifying systems are generally water containing the detackifier compositions.

The detackifier of this invention is a floating/sinking depending on the ratio of the two components, A/B.

The detackifier bonds with paint and removes the stickiness of the paint. Generally, when the invention is working and is appropriately dosed there will be no stickiness to the feel and no paint adhering to any surfaces that come in contact with water and filtration commonly used in paint detackification removal systems.

Having thus described our invention, we claim the following:

1. A paint spray booth detackifying mixture comprising melamine-formaldehyde polymer and styrene acrylate polymer in a mole ratio within the range of 2:1 to 4:1 respectively wherein said molecular weight of said melamine-formaldehyde is within the range of 2,500 to 4,000 and the molecular weight of said styrene acrylate polymer is with the range of 50,000 to 100,000.

* * * * *